United States Patent
Arumugam et al.

(10) Patent No.: US 11,624,035 B2
(45) Date of Patent: Apr. 11, 2023

(54) GAS SCRUBBING PROCESS FOR PURIFYING RAW SYNTHESIS GAS BY PHYSICAL ABSORPTION IN METHANOL

(71) Applicant: L'Air Liquide, Société Anonyme pour l'Etude et l'Exploitation des Procédés Georges Claude, Paris (FR)

(72) Inventors: Ganesh Arumugam, Frankfurt am Main (DE); Dorit Rappold, Frankfurt am Main (DE); Sharon Corbet, Frankfurt am Main (DE); Robert Szabo, Frankfurt am Main (DE)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 29 days.

(21) Appl. No.: 17/324,680

(22) Filed: May 19, 2021

(65) Prior Publication Data

US 2021/0363443 A1 Nov. 25, 2021

(30) Foreign Application Priority Data

May 20, 2020 (EP) .................................... 20020239

(51) Int. Cl.
   B01D 53/14 (2006.01)
   C10K 1/00 (2006.01)
   (Continued)

(52) U.S. Cl.
   CPC .......... C10K 1/003 (2013.01); B01D 53/1425 (2013.01); B01D 53/1456 (2013.01);
   (Continued)

(58) Field of Classification Search
   CPC ........ B01D 2252/2021; B01D 2256/16; B01D 2256/20; B01D 2257/304;
   (Continued)

(56) References Cited

U.S. PATENT DOCUMENTS

2013/0036911 A1 2/2013 Mak
2014/0366728 A1 12/2014 Kerestecioglu et al.
(Continued)

FOREIGN PATENT DOCUMENTS

DE 17 94 060 2/1971
DE 196 10 846 9/1997
(Continued)

OTHER PUBLICATIONS

Ullmann's Encyclopedia of Industrial Chemistry, 6$^{th}$ ed., 2000, vol. 15, 399-407.

(Continued)

*Primary Examiner* — Sharon Pregler
(74) *Attorney, Agent, or Firm* — Elwood L. Haynes (57) ABSTRACT

The invention relates to a gas scrubbing process and plant for purifying raw synthesis gas by physical absorption in methanol. A raw synthesis gas stream which includes hydrogen and carbon monoxide as desired constituents and water and acid gases as undesired constituents is admixed with methanol and subsequently cooled below the freezing point of water. According to the invention a liquid phase including methanol and water is separated from the cooled raw synthesis gas stream. Acid gases are removed from the remaining gaseous phase by physical absorption in methanol at elevated pressure. Separating the water from the raw synthesis gas stream before the absorption of the acid gases prevents larger amounts of water passing into the methanol circuit of the gas scrubbing process. This achieves savings in resources and certain plant parts may be smaller than is customary.

18 Claims, 2 Drawing Sheets

(51) Int. Cl.
*B01D 53/18* (2006.01)
*C10K 1/16* (2006.01)

(52) U.S. Cl.
CPC ......... *B01D 53/1493* (2013.01); *B01D 53/18* (2013.01); *C10K 1/16* (2013.01); *B01D 2252/2021* (2013.01); *B01D 2256/16* (2013.01); *B01D 2256/20* (2013.01); *B01D 2257/304* (2013.01); *B01D 2257/308* (2013.01); *B01D 2257/408* (2013.01); *B01D 2257/504* (2013.01); *B01D 2257/80* (2013.01)

(58) Field of Classification Search
CPC ........ B01D 2257/308; B01D 2257/408; B01D 2257/504; B01D 2257/80; B01D 53/1425; B01D 53/1431; B01D 53/1456; B01D 53/1462; B01D 53/1468; B01D 53/1475; B01D 53/1493; B01D 53/18
See application file for complete search history.

(56) References Cited

U.S. PATENT DOCUMENTS

| | | |
|---|---|---|
| 2015/0321136 A1 | 11/2015 | Seiki et al. |
| 2019/0001256 A1 | 1/2019 | Wen |
| 2020/0101415 A1* | 4/2020 | Corbet ............... B01D 53/1418 |

FOREIGN PATENT DOCUMENTS

| | | |
|---|---|---|
| DE | 10 2013 010103 | 12/2014 |
| EP | 0 270 040 | 6/1988 |
| EP | 3 628 392 | 4/2020 |

OTHER PUBLICATIONS

European Search Report for corresponding EP 20020239, dated Oct. 9, 2020.

* cited by examiner

GAS SCRUBBING PROCESS FOR PURIFYING RAW SYNTHESIS GAS BY PHYSICAL ABSORPTION IN METHANOL

CROSS REFERENCE TO RELATED APPLICATIONS

This application claims the benefit of priority under 35 U.S.C. § 119 (a) and (b) to European Patent Application No. 20020239.8, filed May 20, 2020, the entire contents of which are incorporated herein by reference.

BACKGROUND

Field of the Invention

The invention relates to a process for purifying raw synthesis gas by physical absorption in methanol. The invention further relates to a plant for purifying raw synthesis gas by physical absorption in methanol and to the use of the plant according to the invention in a process according to the invention.

Prior Art

Processes for removal of undesired concomitants from industrial raw synthesis gases by physical absorption are known from the prior art. Thus such processes may be used to remove, down to trace amounts, unwanted constituents of raw synthesis gases produced by gasification or reforming of carbon-containing feedstocks, for example carbon dioxide ($CO_2$), hydrogen sulfide ($H_2S$) and carbonyl sulfide (COS) from the desired synthesis gas constituents such as hydrogen ($H_2$) and carbon monoxide (CO). The abovementioned undesired constituents are often referred to by the umbrella term "acid gases".

These processes also referred to as gas scrubs utilize the properties of liquids to absorb gaseous substances and to keep them in solution in physically or chemically bound form. The efficiency with which a gas is absorbed by a liquid is expressed by the absorption coefficient. The better the absorption or dissolution of the gas in the liquid, the greater the absorption coefficient. The absorption coefficient generally increases with decreasing temperature and, in accordance with Henry's law, with increasing pressure. The liquids employed in gas scrubs are generally also referred to as scrubbing media.

Subsequently to the gas scrub, components scrubbed out of the raw synthesis gas in the gas scrub are removed from the laden scrubbing medium to obtain a regenerated or at least partially regenerated scrubbing medium. Known processes for regeneration of scrubbing medium are decompression (flashing), displacement of an absorbed complement with a stripping gas (stripping), depressurization with a stripping gas and hot regeneration wherein the intrinsic vapor of the scrubbing medium is used as stripping gas. In order to be usable for renewed absorption of gas components from the raw synthesis gas the scrubbing medium is typically subjected to a hot regeneration in the last regeneration stage. The hot regeneration recovers a virtually pure scrubbing medium which is suitable for the renewed absorption of undesired gas constituents from the raw synthesis gas.

An important process for the purification of raw synthesis gases is methanol scrubbing, also known as the Rectisol process, as described for example in Ullmann's Encyclopedia of Industrial Chemistry, 6th Ed. Vol. 15, p. 399 et seq. Among other factors the Rectisol process makes use of the fact that the absorption coefficients of $H_2S$, COS and $CO_2$ in liquid cryogenic methanol differ by several orders of magnitude from those of $H_2$ and CO. After the scrubbing operation the methanol is regenerated and recycled into the process.

In the Rectisol process known from the prior art the raw synthesis gas is initially cooled to a temperature of for example down to −40° C. before it is supplied to the actual absorption in order not to unnecessarily heat the cryogenic methanol employed for the absorption. Since the raw synthesis gas generally comprises a certain proportion of water, for example from a preceding water scrub for removal of ammonia, there is a risk of ice formation in the raw synthesis gas which must be avoided at all costs. For this reason, the raw synthesis gas is admixed with an amount of methanol sufficient for preventing ice formation before it is supplied to the absorption column. The raw synthesis gas supplied to the absorption column thus already comprises a certain amount of methanol and especially water.

The presence of water in the absorption column generally results in a higher demand for methanol in the different methanol circuits and thus in a higher demand for resources. Higher consumption of resources, in particular of refrigerant, steam, electrical energy and cooling water, accordingly, results in higher operating costs (OPEX).

The higher water content in the methanol circuits further results in higher total flow rates in the methanol circuits and thus in higher steam flow rates in the sections for hot regeneration and for methanol-water separation (rectification) of the Rectisol process. This requires enlarging various plant components within the Rectisol process, thus resulting in elevated capital costs (CAPEX).

There is therefore a demand for improved processes.

SUMMARY

It is a general object of the present invention to overcome the abovementioned disadvantages of the prior art.

It is a further object of the invention to minimize the concentration of water in the methanol circuits of the Rectisol process to the greatest possible extent.

The independent claims provide a contribution to the at least partial achievement of at least one of the above objects. The dependent claims provide preferred embodiments which contribute to the at least partial achievement of at least one of the objects. Preferred embodiments of constituents of one category according to the invention are, where relevant, likewise preferred for identically named or corresponding constituents of a respective other category according to the invention.

The terms "having", "comprising" or "containing", etc., do not preclude the possible presence of further elements, ingredients, etc. The indefinite article "a" does not preclude the possible presence of a plurality.

The objects of the invention are at least partially achieved by a process for purifying raw synthesis gas by physical absorption in methanol, wherein the process comprises the following process steps, wherein the following process steps need not necessarily be performed in the specified sequence:

(a) providing a raw synthesis gas stream, wherein the raw synthesis gas of the raw synthesis gas stream comprises hydrogen ($H_2$) and carbon monoxide (CO) as desired constituents and water ($H_2O$) and acid gases as undesired constituents;

(b) admixing the raw synthesis gas stream with methanol;

(c) cooling the methanol-admixed raw synthesis gas stream below the freezing point of water;

(d) separating a liquid phase from the cooled raw synthesis gas stream, wherein the liquid phase comprises methanol and water and the remaining gaseous phase comprises hydrogen, carbon monoxide and acid gases;

(e) removing the acid gases from the gaseous phase obtained according to step (d) by physical absorption in methanol at elevated pressure to obtain a purified synthesis gas stream and a methanol stream laden with acid gases;

(f) regenerating the methanol stream laden with acid gases to obtain a regenerated methanol stream and an acid gas stream;

(g) reusing the regenerated methanol stream obtained according to step (f) for removing acid gases by physical absorption in methanol according to step (e).

The physical absorption of the acid gases is carried out at elevated pressure in cold to cryogenic methanol, wherein the methanol for the absorption is cooled to temperatures of down to −75° C. as described below.

According to the invention the raw synthesis gas stream admixed with methanol according to step (b) is initially cooled below the freezing point of water according to step (c). Cooling may be carried out down to a temperature of −40° C. In one example the raw synthesis gas stream is cooled against purified synthesis gas. After the cooling of the raw synthesis gas stream comprising methanol and water a liquid phase comprising methanol and water is separated from the raw synthesis gas stream according to step (d). In one example the separation of the liquid or condensed methanol-water phase is carried out in a separator known to those skilled in the art. This process step prevents water from the raw synthesis gas being introduced into the actual absorption step according to (e). This significantly reduces the amount of water present in the methanol circuits.

One embodiment of the process according to the invention is characterized in that the liquid phase obtained according to step (d) is subjected to a depressurization (flashing), thus at least partially desorbing gases dissolved in the liquid phase from the liquid phase to obtain a first stream of desorbed gases.

According to step (d) of the process according to the invention a large part of the raw synthesis gas which comprises substantially hydrogen, carbon monoxide and acid gases is separated from the liquid phase (methanol-water phase) by separation of the latter and may be supplied to the absorption step (e). However, a non-negligible proportion of gases remains dissolved in the methanol-water phase and may be desorbed from the methanol-water phase by depressurization.

In this connection it is preferable when the first stream of desorbed gases is supplied to the acid gas stream obtained according to step (f).

The acid gases obtained by regeneration according to step (f) are then no longer recycled into the methanol circuit. It is thus also preferable for the first stream of desorbed gases which may also contain carbon dioxide as acid gas to be recycled to the acid gas stream obtained according to step (f). This prevents components of the first stream of desorbed gases from being returned to one of the methanol circuits.

In this connection it is preferable when the acid gas stream according to step (f) is at least partially obtained by hot regeneration of the methanol stream laden with acid gases and the acid gas stream obtained by hot regeneration contains gaseous methanol and the gaseous methanol is separated from the acid gas stream by cooling, wherein the first stream of desorbed gases is supplied to the acid gas stream obtained by hot regeneration before the separation of the methanol, during the separation of the methanol or after the separation of the methanol.

The last step in a cascade of steps for regeneration of methanol is often a hot regeneration wherein the intrinsic vapor of the absorption medium (methanol) is used as stripping gas. The methanol laden with acid gases is thus freed of the acid gases at least partially by hot regeneration. The acid gas stream obtained in the hot regeneration generally contains a certain proportion of methanol vapor which is separated from the acid gases in a separator for example. The gases of the first stream of desorbed gases may be supplied to the acid gas stream obtained according to step (f) before, during or after the separation of the methanol since the stream of desorbed gases obtained via the preceding decompression generally contains very little, if any, methanol. However, should this be the case after all, the first stream of desorbed gases is advantageously supplied to the acid gas stream obtained according to step (f) before or during separation of the methanol in order to separate the methanol present in the first stream of desorbed gases together with the methanol from the acid gas stream withdrawn from the hot regeneration.

One embodiment of the process according to the invention is characterized in that the first stream of desorbed gases is compressed to absorption pressure and subsequently supplied to step (e) for removing acid gases from the first stream of desorbed gases by physical absorption in methanol.

It is alternatively possible for the first stream of desorbed gases instead of the acid gas stream obtained according to step (f) to be initially compressed to absorption pressure, for example via a so-called recycle gas compressor, in order subsequently to be supplied to the absorption in methanol according to step (e). This procedure is preferable when the proportion of value gases, i.e. hydrogen and carbon monoxide, in the first stream of desorbed gases is relatively high. These value gases are therefore supplied to the purified synthesis gas stream obtained according to step (e) and are not lost with the acid gas stream according to the above-mentioned procedure.

One embodiment of the process according to the invention is characterized in that the acid gas stream according to step (f) is at least partially obtained by depressurization (flashing) of the methanol laden with acid gases and the first stream of desorbed gases is supplied to the acid gas stream obtained by depressurization.

At least one step of a cascade of steps for regeneration of methanol is often characterized by a depressurization, also known as flashing. This comprises subjecting the methanol laden with acid gases at absorption pressure to a depressurization or a plurality of successive depressurizations at pressures decreasing from one step to the next. This liberates not only the acid gases absorbed in methanol but often also value gases (hydrogen, carbon monoxide) co-absorbed in methanol. The acid gases and value gases desorbed by flashing may therefore advantageously be at least partially recompressed to absorption pressure and supplied to the absorption according to step (e) to minimize the loss of value gases. When the first stream of desorbed gases is supplied to the acid gas stream obtained by depressurization the value gases present in the first stream of desorbed gases too are correspondingly recycled and not lost.

One embodiment of the process according to the invention is characterized in that the liquid phase obtained according to step (d) is subjected to a stripping, thus at least partially desorbing gases dissolved in the liquid phase from the liquid phase to obtain a second stream of desorbed gases.

If in the context of the invention reference is made to a "first stream of desorbed gases" this is to be understood as meaning a stream of desorbed gases produced by depressurization (flashing) of the liquid phase. If in the context of the invention reference is made to a "second stream of desorbed gases" this is to be understood as meaning a stream of desorbed gases produced by stripping of the liquid phase.

Alternatively, to a simple depressurization (flashing) the liquid phase (methanol-water phase) obtained according to step (d) may also be subjected to a stripping. Stripping comprises desorbing absorbed gases via a stripping gas introduced into the liquid phase, wherein the stripping may be carried out with or without depressurization.

Suitable stripping gases are known to those skilled in the art.

In one embodiment of the process according to the invention the liquid phase obtained according to step (d) is initially subjected to a depressurization as described hereinabove and subsequently subjected to a stripping as likewise described hereinabove.

One embodiment of the process according to the invention is characterized in that methanol vapor is used as stripping medium.

When methanol vapor is used as stripping medium for stripping the liquid phase obtained according to step (d) the supply of a stripping gas specially provided for stripping may be omitted.

In one aspect of the process according to the invention the regenerating of the methanol stream laden with acid gases according to step (f) is at least partially carried out by removal of water from methanol by a thermal separation process, wherein methanol vapor produced in the thermal separation process is used as stripping medium.

At least one step of a cascade of steps for regeneration of methanol is often characterized by a thermal separation process, for example a rectification, for separation of methanol and water since introduction of water into the methanol absorption column typically cannot be completely avoided even in the context of the process according to the invention. The methanol vapor thus obtained at the top of the methanol-water separating column may advantageously be used as stripping medium for the liquid phase to produce the second stream of desorbed gases. No additional technical complexity for production of a stripping gas is necessary in this case since methanol vapor is in any case produced in the thermal separation of methanol and water.

One aspect of the process according to the invention is characterized in that the second stream of desorbed gases is supplied to the acid gas stream obtained according to step (f).

As described hereinabove the acid gases obtained by regeneration according to step (f) are then no longer recycled into the methanol circuit. It is thus also preferable for the second stream of desorbed gases which may also contain carbon dioxide as acid gas to be recycled to the acid gas stream obtained according to step (f). This prevents components of the second stream of desorbed gases from being returned to one of the methanol circuits.

In this connection it is preferable when the acid gas stream according to step (f) is at least partially obtained by hot regeneration of the methanol laden with acid gases and the acid gas stream obtained by hot regeneration contains gaseous methanol and the gaseous methanol is separated from the acid gas stream by cooling, wherein the second stream of desorbed gases is supplied to the acid gas stream obtained by hot regeneration before the separation of the methanol, during the separation of the methanol or after the separation of the methanol.

The gases of the second stream of desorbed gases may be supplied to the acid gas stream obtained according to step (f) before, during or after the separation of the methanol depending on whether the second stream of desorbed gases obtained by the preceding stripping comprises a high or low proportion of methanol. If methanol vapor is used as stripping medium according to any of the preceding embodiments the second stream of desorbed gases is advantageously supplied to the acid gas stream obtained according to step (f) before or during the separation of the methanol in order to also separate the methanol entrained in the second stream of desorbed gases by the stripping.

One aspect of the process according to the invention is characterized in that after the stripping the liquid phase is supplied to a thermal separation process for separation of methanol and water. It is preferable when after the stripping the liquid phase is supplied to the thermal separation process also used for the at least partial regenerating of the methanol stream laden with acid gases according to step (f) by removal of water from methanol. The water from the liquid phase, i.e. the methanol-water phase, is preferably supplied to the same separating column also used for the methanol-water separation of the main methanol stream.

One aspect of the process according to the invention is characterized in that the raw synthesis gas stream comprises ammonia ($NH_3$) as an undesired constituent and before step (b) the ammonia is at least partially removed from the raw synthesis gas stream by scrubbing with water and the obtained aqueous ammonia solution is removed from the raw synthesis gas stream.

Depending on the source the raw synthesis gas may also comprise ammonia as an impurity. Ammonia is not an acid gas and due to its basic character is therefore preferably removed from the raw synthesis gas before step (b). Otherwise ammonia may in the context of the methanol scrub react with acid gases to form ammonium salts which on account of their limited solubility in methanol, especially in cold methanol, can lead to solid deposits in the methanol circuits.

In this context one aspect of the process according to the invention is characterized in that the raw synthesis gas stream at least partially freed of ammonia is cooled before step (b) to condense aqueous ammonia solution remaining in the raw synthesis gas stream and the aqueous ammonia solution condensed out of the raw synthesis gas stream is separated from the raw synthesis gas stream before step (b).

In the ammonia scrub the water used as absorption medium is typically run countercurrently to the raw synthesis gas stream to be purified in a scrubbing column and the resulting aqueous ammonia solution is withdrawn at the bottom of the scrubbing column. The raw synthesis gas withdrawn at the top of the scrubbing column generally still contains residual amounts of aqueous ammonia solution. The raw synthesis gas is therefore preferably cooled before step (b) of the process according to the invention to allow subsequent separation of these residual amounts from the raw synthesis gas.

The objects of the invention are further at least partially achieved by a plant for purifying raw synthesis gas by physical absorption in methanol, in particular for performing the process according to the invention according to any of the abovementioned embodiments, wherein the plant comprises the following components in fluid connection with one another:

(a) means for producing a raw synthesis gas stream, wherein the raw synthesis gas of the raw synthesis gas stream comprises hydrogen ($H_2$) and carbon monoxide (CO) as desired constituents and water ($H_2O$) and acid gases as undesired constituents;

(b) means for admixing the raw synthesis gas stream with methanol;

(c) means for cooling the methanol-admixed raw synthesis gas stream below the freezing point of water;

(d) means for separating a liquid phase from the cooled raw synthesis gas stream, wherein the liquid phase comprises methanol and water and the remaining gaseous phase comprises hydrogen, carbon monoxide and acid gases;

(e) means for removing the acid gases from the gaseous phase obtainable according to (d) by physical absorption in methanol at elevated pressure, whereby a purified synthesis gas stream is obtainable and a methanol stream laden with acid gases is obtainable;

(f) means for regenerating the methanol stream laden with acid gases, whereby a regenerated methanol stream and an acid gas stream are obtainable;

(g) means for reusing the regenerated methanol stream obtainable according to (f) for removing acid gases by physical absorption in methanol according to (e).

One embodiment of the plant according to the invention is characterized in that the means according to (d) have a depressurization apparatus arranged downstream of them, wherein gases dissolved in the liquid phase are at least partially desorbable from the liquid phase by the depressurization apparatus, thus making it possible to obtain a first stream of desorbed gases.

One embodiment of the plant according to the invention is characterized in that the means according to (d) have a stripping apparatus arranged downstream of them, wherein gases dissolved in the liquid phase are at least partially desorbable from the liquid phase by the stripping apparatus, thus making it possible to obtain a second stream of desorbed gases.

One embodiment of the plant according to the invention is characterized in that the plant comprises an apparatus for thermal separation of methanol and water and the methanol vapors obtainable in the thermal separation of methanol and water are usable as stripping medium in the stripping apparatus.

One embodiment of the plant according to the invention is characterized in that the stripping apparatus and the apparatus for thermal separation of methanol and water are integrated in a common column.

The stripping apparatus and the apparatus for thermal separation may advantageously be integrated in a common column when the methanol vapors obtained in the thermal separation of methanol and water are used in the stripping apparatus. For example the stripping apparatus may be separated from the apparatus for thermal separation by a chimney tray or a similar gas-permeable tray on which liquid may be collected. The methanol vapors from the apparatus for thermal separation then ascend upwards through the chimney tray and pass into the stripping apparatus in which the liquid phase (methanol-water phase) collects on the chimney tray and via the ascending methanol vapors is freed from the gases remaining in the liquid phase. Such an integrated solution is more cost-effective than two separate dedicated columns.

The objects of the present invention are further at least partially solved by the use of the plant according to the invention according to any of the preceding embodiments in a process according to the invention according to any of the preceding embodiments.

Acid Gases

The term acid gases is an umbrella term for those undesired gaseous constituents of a raw synthesis gas which would be acidic in aqueous solution. These especially include the gases hydrogen sulfide ($H_2S$), carbonyl sulfide (COS, reacts in water to form carbon dioxide and hydrogen sulfide), carbon dioxide ($CO_2$) and hydrogen cyanide (HCN).

Purified Synthesis Gas, Purified Synthesis Gas Stream

The purified synthesis gas is a raw synthesis gas freed of undesired constituents or concomitants. Depending on the requirements it is not necessarily the case that undesired constituents must be completely removed from the raw synthesis gas to obtain on-specification synthesis gas. Complete removal of carbon dioxide is in particular not desired in every case since in methanol synthesis for example certain residual amounts of carbon dioxide favor the kinetics of the catalytic conversion.

Undesired Constituents

Constituents or concomitants undesired in raw synthesis gas are for example the abovementioned acid gases and potential catalyst poisons such as alkyl mercaptans, in particular methyl mercaptan and carbon disulfide, and also aromatic heterocyclic sulfur compounds, in particular thiophene. Alkyl mercaptans and aromatic heterocyclic sulfur compounds in particular occur in raw synthesis gases from coal gasification. Further concomitants possibly present in the raw synthesis gas are compounds such as ammonia and metal carbonyls which may be formed as gaseous or volatile liquid compounds from metal ions occurring in coal and carbon monoxide. In the metal carbonyls carbon monoxide is coordinatively bonded to a central metal atom. Metal carbonyls can cause problems due in particular to their propensity for reacting with hydrogen sulfide and forming poorly soluble metal sulfides. Metal carbonyls occurring in industrial gas scrubbing processes include in particular nickel carbonyls and iron carbonyls.

Further possible concomitants are aliphatic, alicyclic and aromatic hydrocarbon compounds gaseous at standard pressure and also low-boiling and higher-boiling representatives of said compounds. The aromatic hydrocarbon compounds include in particular benzene, toluene and xylenes (ortho-, meta- and para-xylene) and also naphthalene. The gaseous and also low-boiling and higher-boiling aliphatic and alicyclic hydrocarbons include in particular the homologous series of the cycloalkanes and to a lesser extent alkenes and alkynes, for example having 1 to 12 carbon atoms, in particular having 1 to 6 carbon atoms.

Elevated Pressure

The absorption of the undesired concomitants in the scrubbing medium is carried out under elevated pressure since the absorption coefficient increases with increasing pressure. The absorption is therefore typically carried out at pressures between 20 and 100 bar.

Regeneration

To remove the undesired concomitants from the scrubbing medium, for regeneration of the scrubbing medium, the pressure is typically reduced to 1.5 to 70 bar depending on whether a high-pressure regeneration (20 to 70 bar), intermediate pressure regeneration (15 to 40 bar) or low pressure regeneration (0 to 15 bar, preferably 1.5 to 15 bar) is concerned. In one example such regeneration columns are arranged in series in a cascade, the pressure decreasing from one column to the next.

In a regeneration column the undesired concomitants may be removed either exclusively by pressure reduction (flashing), with or without pressure reduction in conjunction with a stripping gas (stripping) or by hot regeneration. One example of a suitable stripping gas is nitrogen. In hot regeneration the intrinsic vapor of the scrubbing medium, for example methanol, is typically utilized as stripping gas.

Physical Absorption

Physical absorption is brought about by a physical scrubbing medium. This means that the solubility of the relevant gas, for example of the undesired concomitant, is brought about by physical interactions.

In the case of physical scrubbing media, the absorption of the undesired concomitants is preferably effected using cold scrubbing media cooled to below ambient temperature as the absorbent since the absorption coefficient for the undesired constituents increases with decreasing temperature of the scrubbing medium. Intensive mass transfer between the raw synthesis gas and the scrubbing medium takes place in an absorption column, also known as a scrubbing column. The absorption column in which the raw synthesis gas and the scrubbing medium are run in countercurrent to one another may be provided with random packings or trays to improve mass transfer.

According to the invention the absorbent is methanol which as cold methanol is preferably cooled down to −30° C., down to −40° C., down to −50° C., down to −60° C. or even down to −75° C. Methanol has the advantage that even at extremely low temperatures its viscosity is low enough to ensure it remains readily processable in terms of process engineering.

BRIEF DESCRIPTION OF THE DRAWINGS

The invention is hereinbelow particularized by a working example in conjunction with two drawings and a numerical example, wherein the working example, the drawings and the numerical example and not intended to limit the invention in any way. The drawings are not to scale unless otherwise stated.

DETAILED DESCRIPTION OF PREFERRED EMBODIMENTS

Figure 1:
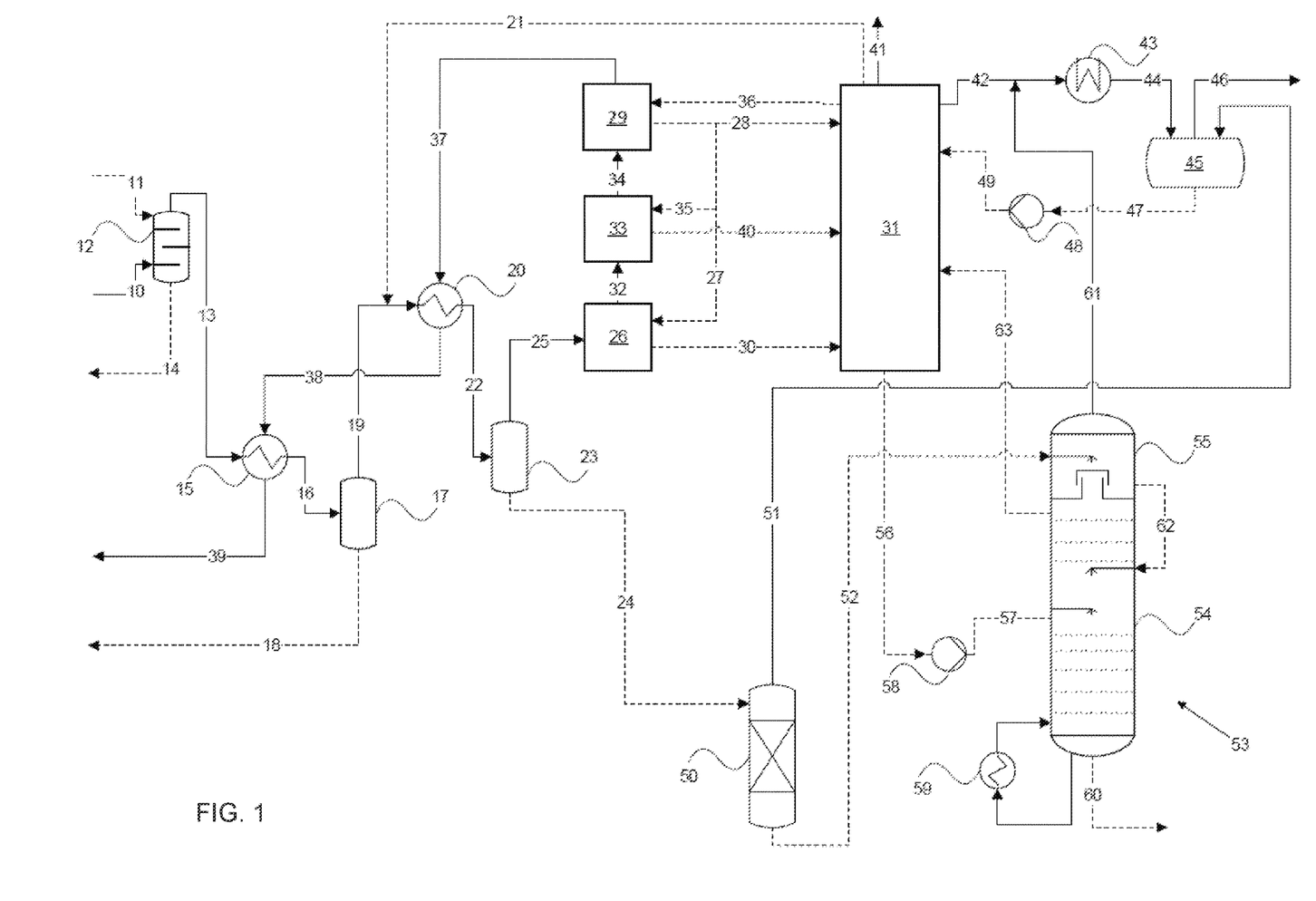
FIG. 1 shows a process flow diagram of the process according to the invention or the plant according to the invention and FIG. 2 shows a process flow diagram of a process or a plant according to the prior art.
Figure 2:
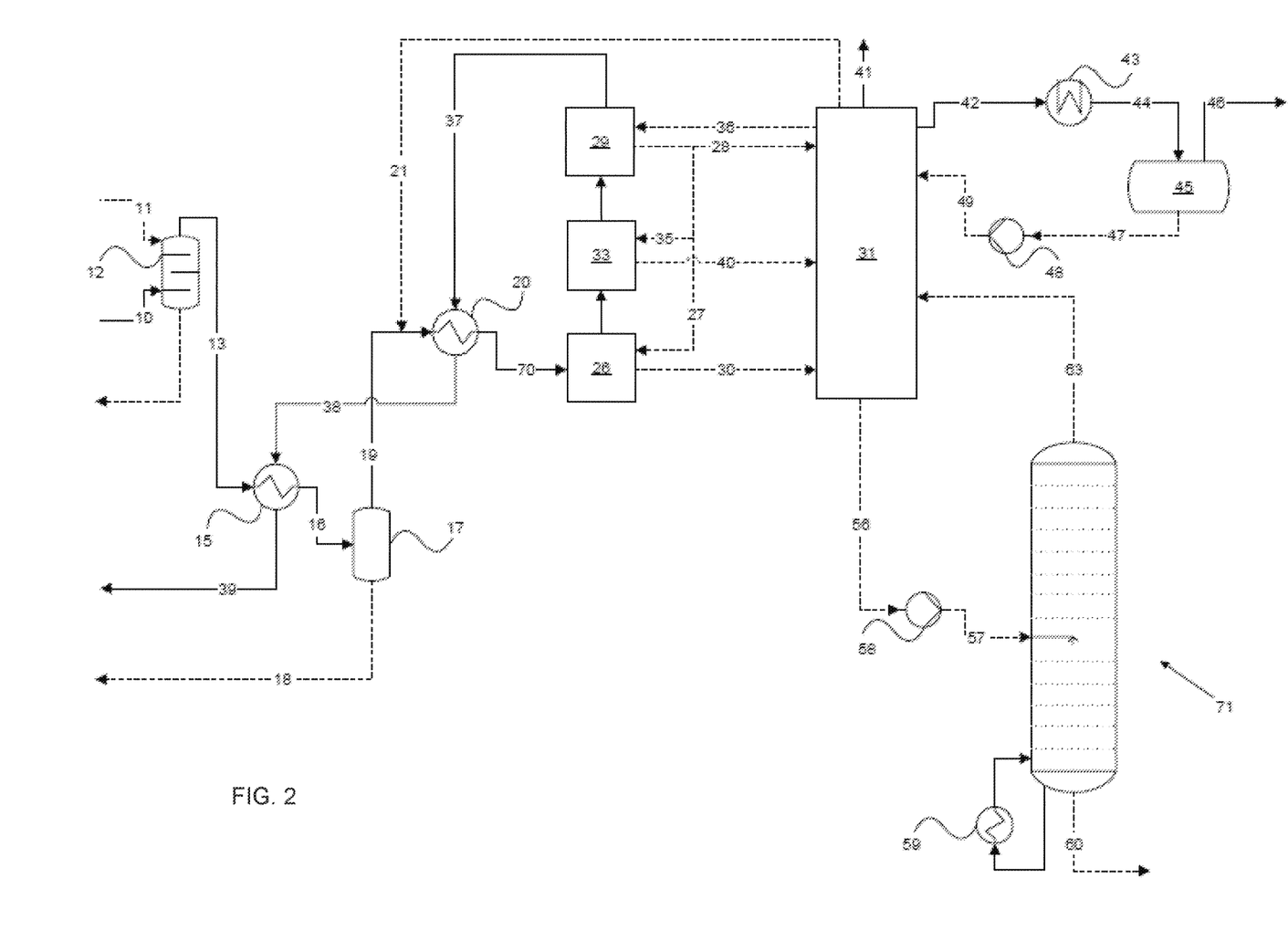

In FIGS. 1 and 2 streams of gases are shown as solid lines while streams of liquids are shown as dashed lines.

FIG. 1 shows an embodiment of the process according to the invention or the plant according to the invention with the aid of a much-simplified process flow diagram.

A raw synthesis gas stream containing at least hydrogen, carbon monoxide, acid gases and ammonia is via conduit 10 initially introduced into the bottom region of an ammonia scrubber 12 which is traversed from top to bottom with boiler feed water which is introduced via conduit 11 into the top region of the ammonia scrubber 12. As a result of the transfer processes between the raw synthesis gas and the water in the countercurrent of the ammonia scrubber 12 the raw synthesis gas is largely freed of ammonia and withdrawn from the ammonia scrubber 12 via conduit 13. Scrubbing solution resulting as bottoms product in the ammonia scrubber 12, in this case aqueous ammonia solution, is withdrawn by a conduit 14 and subjected to a further workup external to the process (not shown). The raw synthesis gas which as a consequence of the ammonia scrub contains relatively small amounts of non-condensed aqueous ammonia solution is subsequently cooled in heat exchanger 15 against purified synthesis gas from conduit 38. The cooled raw synthesis gas is supplied via conduit 16 to a separator 17 in which, once condensed, the aqueous ammonia solution remaining in the raw synthesis gas is separated from the gaseous constituents of the raw synthesis gas. The aqueous ammonia solution condensed in the separator 17 is withdrawn from the separator 17 via conduit 18 as bottoms product and subjected to a further workup external to the process (not shown).

The raw synthesis gas largely freed of ammonia is withdrawn from the separator 17 as tops product and via conduit 19 supplied to the heat exchanger 20. Before entry into the heat exchanger 20 the raw synthesis gas which still contains water is admixed with methanol from conduit 21. In the heat exchanger 20 the methanol-admixed raw synthesis gas is subsequently cooled down to minus 40° C. Addition of the methanol from conduit 21 prevents water present in the raw synthesis gas from freezing and thus causing blockages in the conduit systems of the gas scrubbing process.

The methanol-admixed raw synthesis gas cooled down to minus 40° C. is subsequently supplied via conduit 22 to a separator 23 in which, once condensed, a phase which is liquid according to the invention (methanol-water phase) is separated from the cooled raw synthesis gas stream. The liquid phase is withdrawn from the separator 23 via conduit 24 while the remaining gaseous phase of the raw synthesis gas which contains at least hydrogen, carbon monoxide and acid gases is supplied via conduit 25 to the absorption region of the gas scrubbing process for removal of the acid gases at elevated pressure.

For absorption of the acid gases from the raw synthesis gas stream the raw synthesis gas is initially supplied via conduit 25 to a prescrubbing stage 26 where it is countercurrently treated with cryogenic methanol from methanol stream 27. Methanol stream 27 is diverted from methanol stream 28 and already contains carbon dioxide absorbed from a second main scrubbing stage 29. The prescrubbing stage 26 mainly frees the raw synthesis gas of hydrogen cyanide (HCN) while simultaneously co-absorbing small amounts of sulfur compounds such as for example alkyl mercaptans and, unavoidably, also very small amounts of value gases (hydrogen, carbon monoxide). The laden methanol obtained in the prescrubbing stage is supplied via conduit 30 to the regeneration system 31.

The raw synthesis gas stream freed of hydrogen cyanide and further compounds is supplied via conduit 32 to a first main scrubbing stage 33. In the first main scrubbing stage 33 the raw synthesis gas is countercurrently treated with methanol diverted from methanol stream 27 as substream 35 and already contains carbon dioxide absorbed in the second main scrubbing stage 29. In the first main scrubbing stage 33 the raw synthesis gas is substantially freed of hydrogen sulfide and carbonyl sulfide. Raw synthesis gas substantially still containing carbon dioxide as an undesired constituent is subsequently withdrawn from the first main scrubbing stage 33 and in the second main scrubbing stage 29 treated with regenerated methanol from conduit 36 to absorb carbon dioxide. The fully purified synthesis gas is subsequently discharged from the process via the conduits 37, 38 and 39, thus passing through the heat exchangers 15 and 20 and being utilized to cool the raw synthesis gas stream.

The methanol streams laden with acid gases 28, 30 and 40 which are withdrawn from the prescrubbing stage 26 and the two main scrubbing stages 29 and 33 are subsequently freed of the abovementioned absorbed acid gas constituents in the regeneration system 31. Regeneration system 31 comprises at least a plurality of flash regeneration stages arranged as a cascade, a hot regenerator and optionally a reabsorber. Arrangements of these components typical for the Rectisol process are well known to those skilled in the art. For the sake of simplicity, the abovementioned components are therefore not shown individually but rather as a block.

The regeneration system 31 affords a carbon dioxide stream in conduit 41, two methanol streams in the conduits 21 and 36 (in each case regenerated methanol) and a stream containing mainly sulfur-containing acid gases (hydrogen sulfide, carbonyl sulfide) in conduit 42. Carbon dioxide in conduit 41 is discharged from the process and sent for further processing (not shown). Methanol stream in conduit 21 is added to the raw synthesis gas stream from conduit 19 as described hereinabove to avoid ice formation in the raw synthesis gas stream in conduit 19. Methanol stream in conduit 36 is used for absorption of carbon dioxide in the second main scrubbing stage 29.

The acid gas stream in conduit 42 originates from the hot regeneration part of the regeneration system 31. It therefore contains sulfur-containing acid gases, substantially hydrogen sulfide and carbonyl sulfide, and methanol not condensed in the course of the hot regeneration, i.e. entrained methanol. This uncondensed, i.e. vaporous, methanol is together with the sulfur-containing acid gases cooled in heat exchanger 43 to such an extent that after passing via conduit 44 into a separation vessel 45 the methanol condenses in the separation vessel 45. Co-obtained acid gases, the gaseous phase obtained in the separation vessel, consist substantially of sulfur-containing acids gases. These sulfur-containing acid gases are withdrawn from the separation vessel 45 via conduit 46 and sent to a plant for recovery of sulfur by the Claus process (not shown). The separated, condensed methanol is withdrawn from the separation vessel 45 via conduit 47 and using pump 48 recycled into the regeneration system 31 via conduit 49.

As described hereinabove the separator 23 separates the phase that is liquid according to the invention (methanol-water phase) by condensation from the cooled raw synthesis gas. This is withdrawn from the separator 23 via conduit 24 and supplied to a flash vessel 50. Depressurization in the flash vessel 50 has the result that gases dissolved in the liquid phase are at least partially desorbed from the liquid phase to obtain a first stream of desorbed gases according to the invention. The first stream of desorbed gases is withdrawn and supplied to separation vessel 45 via conduit 51. The gases desorbed by depressurization in the flash vessel 50 are thus discharged from the process via conduit 46 together with the acid gases from separation vessel 45.

The liquid phase remaining in the flash vessel 50 (methanol-water phase) which still contains absorbed gases is supplied via conduit 52 to a combined column 53 which comprises a region for thermal separation of methanol by rectification 54 and a stripping region 55.

The lower region 54 of the combined column 53 is supplied with at least partially regenerated, water-containing methanol from the regeneration system 31 via the conduits 56 and 57 using the pump 58. The methanol-water mixture in the lower part 54 of the combined column 53 is heated to boiling via a boiler 59. The bottoms product obtained in the lower part 54 of the combined column 53 is water which is withdrawn via conduit 60 and sent for further workup (not shown). After passing through the chimney tray methanol vapors ascending in the lower part 54 of the column 53 pass into the upper stripping region 55 of the column 53. The stripping region 55 is also supplied with the aqueous phase (methanol-water phase) via conduit 52. The methanol vapors passing into the stripping region 55 cause further gases absorbed in the aqueous phase to be desorbed, thus affording a second stream of desorbed gases according to the invention which is withdrawn from the stripping region 55 of the column 53 via conduit 61. As the second stream of desorbed gases contains smaller amounts of methanol vapors from the stripping, the gases from conduit 61 are supplied to the acid gas stream in conduit 42 upstream of the heat exchanger 43 in order that the methanol entrained in conduit 61 may be separated as a liquid by cooling in heat exchanger 43 and subsequent condensation in separation vessel 45 and recycled into the regeneration system 31 via pump 48. The second stream of desorbed gases freed of methanol is discharged from the process via conduit 46 together with the further acid gases.

The liquid phase largely freed of absorbed gases (methanol-water phase) collects on the chimney trays of the stripping region 55 and is supplied to the lower region 54 of the column 53 via conduit 62 for methanol-water separation. Removed water exits the column as bottoms product via conduit 60 while removed methanol exits the lower region 54 of the column 53 as tops product via conduit 63 and is supplied to the regeneration system 31. The methanol supplied to the regeneration system 31 in conduit 63 may either be employed directly for renewed absorption, for example of carbon dioxide in the second main scrubbing stage 36, or is initially subjected to a hot regeneration which is part of the regeneration system 31.

The process mode according to the invention ensures that as a result of the removal in separator 23 water does not in the first place pass into the absorption region of the process comprising the absorption stages 26 (prescrubbing stage), 33 and 29 (main scrubbing stages). Furthermore, all subsequent process steps ensure that the water removed in separator 23 can no longer pass back into any of the methanol circuits. This is ensured by the flash vessel 50 in conjunction with the combined column 53. The process mode is such that the water removed in separator 23 together with methanol is ultimately always withdrawn from the combined column as bottoms product via conduit 60.

FIG. 2 shows a process such as is known from the prior art. Reference numerals used in FIG. 1 are also used for FIG. 2 where the same elements are concerned.

In contrast with the process according to the invention of FIG. 1 once admixed with methanol from conduit 21 the cooled raw synthesis gas in conduit 70 is directly supplied to the absorption in the scrubbing stages 26, 29 and 33. This causes all of the water originally present in the raw synthesis gas or entrained by the ammonia scrub to pass into the methanol circuits of the gas scrubbing process which entails the disadvantages described hereinabove. In contrast to the process according to the invention this process does not use a combined column according to FIG. 1 (column 53) but rather a simple rectification column 71 for separation of methanol and water.

The following numerical example (simulation) shows the advantages of the process according to the invention as per the inventive example of FIG. 1 compared to the noninventive comparative example of FIG. 2.

| Parameter | Unit | Comparative example (FIG. 2) | Example (FIG. 1) |
|---|---|---|---|
| Coolant | kW | 8300 | 8290 |
| Energy | kW | 5139 | 5130 |
| Cooling water | t/h | 2971 | 1580 |
| LP Steam | t/h | 22.7 | 15.1 |
| LLP Steam | t/h | 44.2 | 23.8 |
| Water content in methanol circuit | mol % | 2.00 | 0.86 |
| Diameter of hot regenerator | mm | 5400 | 4800 |
| Diameter of methanol-water separating column | mm | 2500 | 1800 |

The numerical example demonstrates that the inventive process scheme makes it possible to achieve savings in resources (coolant, energy, cooling water and steam). The reduced water content in the methanol circuit additionally allows the hot regenerator and the methanol-water separating column to have a smaller diameter.

Embodiments of the invention are described with reference to different types of subject-matter. In particular, certain embodiments are described with reference to process claims while other embodiments are described with reference to apparatus claims. However, it will be apparent to a person skilled in the art from the description hereinabove and hereinbelow that unless otherwise stated in addition to any combination of features belonging to one type of claim any combination of features relating to different types of subject-matter or types of claim may also be contemplated. Features may be combined to achieve synergistic effects which go beyond simple summation of the technical features.

While the invention has been represented and described in detail in the drawing and the preceding description, such a representation and description shall be considered elucidatory or exemplary and non-limiting. The invention is not limited to the disclosed embodiments. Other variations of the disclosed embodiments may be understood and executed by those skilled in the art of the field of the claimed invention from a study of the drawing, the disclosure and the dependent claims.

LIST OF REFERENCE NUMERALS 10, 13, 16, 19, 22, 25, 32, 34, 37, Conduit (Gas)
38, 39, 41, 42, 44, 46, 51, 61, 70
11, 14, 18, 21, 24, 27, 28, 30, 35, Conduit (liquid)
36, 40, 47, 49, 52, 56, 57, 60, 62,
63
12 Ammonia scrubber
15, 20, 43, 59 Heat exchanger
17, 23 Separator
26 Prescrubbing stage
33 First main scrubbing stage
29 Second main scrubbing stage
31 Regeneration system
35 Separation vessel
48,58 Pump
50 Flash vessel
53 Combined column
54 Region for methanol-water separation
55 Stripping region
71 methanol-water separating column

What is claimed is:

1. A process for purifying raw synthesis gas by physical absorption in methanol, comprising:
   (a) providing a raw synthesis gas stream, wherein the raw synthesis gas of the raw synthesis gas stream comprises hydrogen and carbon monoxide as desired constituents and water and acid gases as undesired constituents;
   (b) admixing the raw synthesis gas stream with methanol;
   (c) cooling the methanol-admixed raw synthesis gas stream below the freezing point of water;
   (d) separating a liquid phase from the cooled raw synthesis gas stream, wherein the liquid phase comprises methanol and water and the remaining gaseous phase comprises hydrogen, carbon monoxide and acid gases;
   (e) removing the acid gases from the gaseous phase obtained according to step (d) by physical absorption in methanol at elevated pressure to obtain a purified synthesis gas stream and a methanol stream laden with acid gases;
   (f) regenerating the methanol stream laden with acid gases to obtain a regenerated methanol stream and an acid gas stream; and
   (g) reusing the regenerated methanol stream obtained according to step (f) for removing acid gases by physical absorption in methanol according to step (e).

2. The process according to claim 1, wherein the liquid phase obtained according to step (d) is subjected to a depressurization, thus at least partially desorbing gases dissolved in the liquid phase from the liquid phase to obtain a first stream of desorbed gases.

3. The process according to claim 2, wherein the first stream of desorbed gases is supplied to the acid gas stream obtained according to step (f).

4. The process according to claim 3, wherein the acid gas stream according to step (f) is at least partially obtained by hot regeneration of the methanol stream laden with acid gases and the acid gas stream obtained by hot regeneration contains gaseous methanol and the gaseous methanol is separated from the acid gas stream by cooling, wherein the first stream of desorbed gases is supplied to the acid gas stream obtained by hot regeneration before the separation of the methanol, during the separation of the methanol or after the separation of the methanol.

5. The process according to claim 2, wherein the first stream of desorbed gases is compressed to absorption pressure and subsequently supplied to step (e) for removing acid gases from the first stream of desorbed gases by physical absorption in methanol.

6. The process according to claim 2, wherein the acid gas stream according to step (f) is at least partially obtained by depressurization (flashing) of the methanol laden with acid gases and the first stream of desorbed gases is supplied to the acid gas stream obtained by depressurization.

7. The process according to claim 1, wherein the liquid phase obtained according to step (d) is subjected to a stripping, thus at least partially desorbing gases dissolved in the liquid phase from the liquid phase to obtain a second stream of desorbed gases.

8. The process according to claim 7, wherein methanol vapor is used as stripping medium.

9. The process according to claim 8, wherein the regenerating of the methanol stream laden with acid gases according to step (f) is at least partially carried out by removal of water from methanol by a thermal separation process, wherein methanol vapor produced in the thermal separation process is used as stripping medium.

10. The process according to claim 7, wherein the second stream of desorbed gases is supplied to the acid gas stream obtained according to step (f).

11. The process according to claim 7, wherein, after the stripping the liquid phase is supplied to a thermal separation process for separation of methanol and water.

12. The process according to claim 1, wherein the raw synthesis gas stream comprises ammonia as an undesired constituent and before step (b) the ammonia is at least partially removed from the raw synthesis gas stream by scrubbing with water and the obtained aqueous ammonia solution is removed from the raw synthesis gas stream.

13. The process according to claim 12, wherein the raw synthesis gas stream at least partially freed of ammonia is cooled before step (b) to condense aqueous ammonia solution remaining in the raw synthesis gas stream and the aqueous ammonia solution condensed out of the raw synthesis gas stream is separated from the raw synthesis gas stream before step (b).

14. A plant for purifying raw synthesis gas by physical absorption in methanol performing the process according to claim 1, the plant comprising the following components in fluid connection with one another:
(a) a means for producing a raw synthesis gas stream, wherein the raw synthesis gas of the raw synthesis gas stream comprises hydrogen and carbon monoxide as desired constituents and water and acid gases as undesired constituents;
(b) a means for admixing the raw synthesis gas stream with methanol;
(c) a means for cooling the methanol-admixed raw synthesis gas stream below the freezing point of water;
(d) a means for separating a liquid phase from the cooled raw synthesis gas stream, wherein the liquid phase comprises methanol and water and the remaining gaseous phase comprises hydrogen, carbon monoxide and acid gases;
(e) a means for removing the acid gases from the gaseous phase obtainable according to (d) by physical absorption in methanol at elevated pressure, whereby a purified synthesis gas stream is obtainable and a methanol stream laden with acid gases is obtainable;
(f) a means for regenerating the methanol stream laden with acid gases, whereby a regenerated methanol stream and an acid gas stream are obtainable; and
(g) a means for reusing the regenerated methanol stream obtainable according to (f) for removing acid gases by physical absorption in methanol according to (e).

15. The plant according to claim 14, wherein the means according to (d) have a depressurization apparatus arranged downstream of them, wherein gases dissolved in the liquid phase are at least partially desorbable from the liquid phase by the depressurization apparatus, thus making it possible to obtain a first stream of desorbed gases.

16. The plant according to claim 14, wherein the means according to (d) have a stripping apparatus arranged downstream of them, wherein gases dissolved in the liquid phase are at least partially desorbable from the liquid phase by the stripping apparatus, thus making it possible to obtain a second stream of desorbed gases.

17. The plant according to claim 16, further comprising an apparatus for thermal separation of methanol and water and the methanol vapors obtainable in the thermal separation of methanol and water are usable as stripping medium in the stripping apparatus.

18. A plant according to claim 17, wherein the stripping apparatus and the apparatus for thermal separation of methanol and water are integrated in a common column.

* * * * *